UNITED STATES PATENT OFFICE.

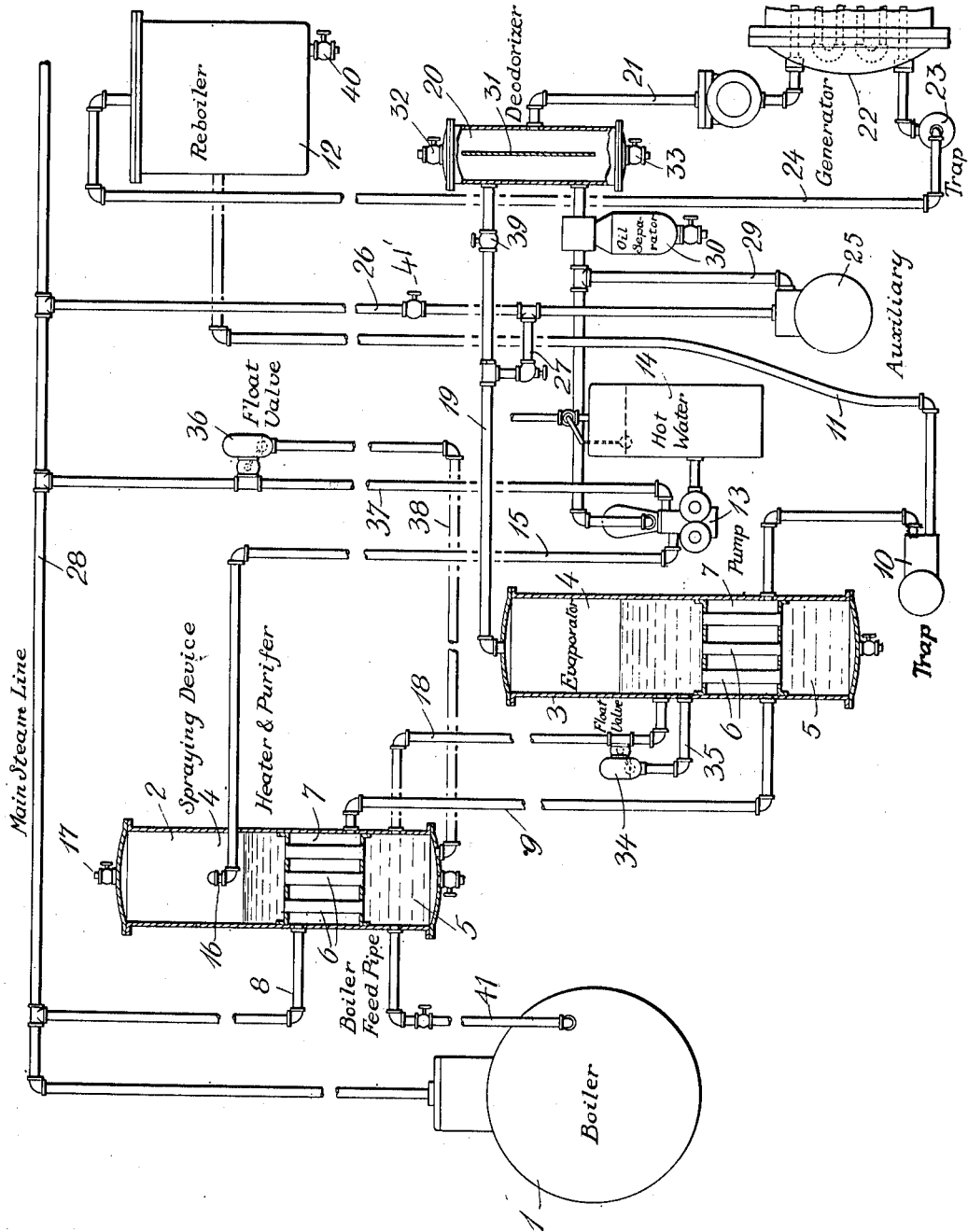

NICOLAI H. HILLER, OF CARBONDALE, PENNSYLVANIA.

METHOD OF EVAPORATION AND APPARATUS THEREFOR.

970,051.  Specification of Letters Patent. Patented Sept. 13, 1910.

Application filed February 20, 1909. Serial No. 479,049.

*To all whom it may concern:*

Be it known that I, NICOLAI H. HILLER, a citizen of the United States of America, and a resident of Carbondale, county of Lackawanna, and State of Pennsylvania, have invented a certain new and useful Method of Evaporation and Apparatus Therefor, of which the following is a specification.

My invention relates to a method of evaporation and apparatus therefor, and is particularly intended for the production of pure distilled water such as is desired for the making of artificial ice, but is also applicable to the production of drinking water on shipboard and elsewhere, where purification of water by distillation is desired, also for the distillation of other liquids.

My invention further comprises a combination of distilling apparatus and absorption refrigeration apparatus, wherein steam formed in the apparatus is supplied to the heated coils of the generator of the absorption apparatus, the condensate from said coils being passed to a reboiler of the evaporating apparatus, and, after reboiling, being used for the making of ice or for any other purpose for which pure water is desired.

My invention comprises distillation of water derived from any convenient source, preferably a source of supply of hot water, and the elimination of gaseous impurities at or before the time of such evaporation, the condensation of the steam so produced, either in the coils of the generator of an absorption apparatus or elsewhere, and the reboiling of the condensate by mixture with the condensate from the evaporating apparatus, and also comprises various features of the apparatus, all as hereinafter described and particularly pointed out in the appended claims.

In the production of pure water for ice making, it is found that oftentimes mere evaporation and condensation of the water so as to produce ordinary distilled water, is not sufficient, as such distilled water is apt to contain various dissolved gases which impart to the water, and to the ice made therefrom, a disagreeable taste. To obviate this it is customary to heat and agitate the water, after condensation, to drive off such dissolved gases; such step being commonly termed reboiling, although only a portion of the distilled water is, in practice, reevaporated, the heat and agitation due to the boiling off of a portion of the water, sufficing to carry off the dissolved gases. The distilled water so reboiled is, in part at least, when the refrigeration apparatus used is of the absorption type, the water of condensation trapped off from the steam coils of the generator of the refrigeration apparatus.

It is customary to supply steam for the operation of the stills or generators of absorption refrigeration apparatus, by conducting the exhaust from the various pumps and other auxiliaries of such apparatus to the generator, but as such exhaust steam is usually far from sufficient for the purpose, it is usually customary to supplement the exhaust steam by the supply of live steam from a boiler, with consequent considerably increased cost of water purification as compared with what would be possible if all of the evaporation in the generator were conducted by exhaust steam. Furthermore, the steam required by the generator is not in itself sufficient to supply the amount of distilled water which can be frozen by the refrigerating apparatus of which that generator forms a part, working at full capacity. Thus: About ninety pounds of distilled water per hour is required to make one ton of ice in twenty four hours. The generator of the absorption apparatus will supply about sixty pounds of this amount, of which sixty pounds, approximately thirty five pounds, will be supplied by the exhaust from the pumps and other auxiliaries, the difference between this thirty five pounds and the sixty pounds being supplied ordinarily by live steam from the boiler, and the further difference between the ninety pounds required for the ice and the sixty pounds furnished by the generator, being also supplied by means of live steam condensed.

The accompanying drawing illustrates more or less diagrammatically and with certain of its parts shown in section, one form of apparatus embodying my invention, and adapted for carrying out the method of evaporation and purification herein described.

In said drawings 1 designates a boiler or other suitable source of live steam. Since this boiler commonly supplies steam to operate the auxiliaries of the absorption refrigeration apparatus, hereinafter mentioned, as well as to operate various other machinery, it must be operated at a pressure much higher than the pressure desired in the coils of the generator of the absorption refrigeration apparatus, and at a pressure too high to permit the economical production of pure water by the condensation of such steam without utilization of the heat contained in such steam; hence, in part, the economy resulting from using this high pressure steam, according to the present invention, in an evaporator, to produce lower pressure steam for the generator.

2 and 3 designate sections of an evaporating apparatus. These sections are of similar construction, each comprising an upper chamber 4 and a lower chamber 5 connected by tubes 6 passing through an intermediate chamber 7. In this construction, the section 2 of the evaporating apparatus constitutes in the main a heater and purifier, the lower section, 3, being the evaporator proper.
Live steam is supplied from the boiler 1 to the intermediate chamber 7 of the heater 2, by means of a pipe 8, the steam and condensate from this chamber passing through a pipe 9 to the corresponding chamber 7 of the section 3 of the apparatus; the condensate from the chamber 7 of this lower section, 3, being trapped off, by means of a trap 10 of suitable construction, and passing thence through a convenient pipe 11, to the reboiler 12.

Water to be evaporated is supplied by means of a pump 13, from a hot well 14 or other convenient source of supply, being forced by said pump from the hot well through a convenient pipe 15 to the upper chamber 4 of the heater 2. This pipe 15 terminates within chamber 4 of heater 2, in a spraying device 16, which creates an upwardly directed spray, the object being to facilitate separation of condensed gases from the water, so supplied to the heater. In the upper part of the heater is a discharge valve 17 through which the separated gases are permitted to escape. The water which collects in the lower part of this chamber 4 of the heater, passes thence through the tubes 6 to the lower chamber 5 of the heater and thence passes through a pipe 18 to the upper chamber 4 of the evaporating section 3 of the apparatus. In this evaporating section 3 the water is evaporated, the resulting steam passing off through pipe 19 to a "deodorizer" 20 and thence passing through a pipe 21 to the generator 22 of the absorption refrigeration apparatus; the steam being condensed in the coils of this generator as a result of imparting heat to the aqua ammonia or other liquid contained in the generator, the condensate from the coils of this generator being trapped off by means of a suitable trap 23 and thence conveyed by a pipe 24 to the reboiler 12. In this reboiler some evaporation of the water of condensation occurs, owing to the fact that the water supplied from trap 10, having been condensed under pressure, has a temperature somewhat higher than the boiling point at atmospheric pressure; and the water of condensation from the coils of generator 22 may also have a temperature somewhat higher than the boiling point of water at atmospheric pressure. This evaporation, commonly termed "reboiling," causes the evaporation of only a small portion of the water, but the consequent agitation and disengagement of steam causes the separation from the water of dissolved gases which may still be contained therein.

I have indicated in connection with this apparatus an engine 25 which may be considered as a diagrammatic representation of one or more of the auxiliaries customarily employed in connection with refrigeration plants. Such auxiliary or auxiliaries may be supplied with live steam from the boiler through a pipe 26, or may be operated on steam from the evaporator, for which purpose I have indicated a by-pass 27 with suitable valves in said by-pass and in the pipe 26, so that steam may be taken for the operation of the engine or engines 25 either from the main steam line 28 or from the pipe 19 leading from the evaporating apparatus or from both. The exhaust from the auxiliary or auxiliaries is conveyed by a pipe 29 to an oil separator 30, and thence to the "deodorizer" 20. This "deodorizer" consists in principle of a chamber containing a baffle 31, said chamber being further provided with a valve 32 at the top and a valve 33 at the bottom, these valves being open more or less during the operation of the apparatus so that any gas carried with the steam may escape through valve 32 and any condensed liquid or oil may escape through valve 33.

The heater 2 is customarily located at such height above the boiler 1 that the boiler may be fed by gravity from the heater, notwithstanding that the pressure in said heater is somewhat lower than that in the boiler. Thus, for instance, supposing that the pressure carried in the boiler is one hundred pounds, the pressure carried in the heater 2 will be about ninety five pounds, and that in the evaporating section 3 of the evaporator will be lower than that in the heater 2. With such an arrangement, the heater 2, if located from ten to fifteen feet above the boiler, will feed the same by gravity.

I have indicated a float valve 4 for regulating the level of the water in the evaporating section 3 of the distilling apparatus, the float chamber of such valve being connected by a pipe 35 to the water space of section 3; and I have indicated a similar float valve 36 for controlling the level of the water in the evaporator 2, such valve controlling the flow of steam through the steam line 37 of the pump 13, the float chamber of this valve 36 being connected by a pipe 38 to the water space of the heater 2. It will be noted that in this arrangement of apparatus feed water is supplied to the boiler 1 at very nearly the temperature of evaporation in the boiler. The hot water supplied to the hot well 14 and so to the evaporating apparatus may be supplied from any convenient source, for instance, from the rectifier of the refrigerating apparatus, and may have been heated by exchange of heat with the water from the reboiler, a suitable heat exchanger being used for the purpose. The hot water discharged into the upper chamber 4 of the heater 2 through the spraying device 16 readily parts with contained gaseous impurities when so sprayed, and such gases are blown off, from time to time or continuously, through valve 17, the water passed from heater 2 to the boiler 1 and to the evaporating section 3 being free from these impurities, therefore. The water evaporated in section 3 passes as steam to the coils of the generator 22, and some of it may also be used to operate the auxiliaries of the plant and then may be passed into the coils of the generator 22 with the steam coming direct from the evaporator, a suitable valve 39 providing the necessary drop in pressure to permit this. The oil separator 30 and "deodorizer" 20 are provided to remove from the exhaust steam from the auxiliaries any possible taint due to lubrication of those auxiliaries. The water condensed in the coils of the generator 22 then passes to the reboiler 12, and there meets the water condensed in the heating chambers of the evaporating apparatus, the water from these two sources being purified by "reboiling," and then being delivered through discharge connection 40 where required.

The arrangement of apparatus above described has special advantages in plants where the auxiliaries customarily, or at times, use nearly as much steam as is required to operate the generator 22—i. e., are capable, at times, of supplying to said generator nearly all the exhaust steam required to operate it. In such case, the auxiliaries may be operated by steam from the boiler, delivered through pipe 26, such additional steam as may be required by the generator being supplied from the evaporator, such supply being regulated by valve 39. Or, in case the auxiliaries take too much steam, the supply of steam through pipe 26, direct from the boiler, may be discontinued, and they may be supplied instead from the evaporator, by means of the by-pass 27; and if the auxiliaries require more steam than the evaporator can supply, valve 41' in pipe 26 may be opened sufficiently to supply the deficiency. The apparatus arranged as described is therefore very elastic, being readily adapted to a wide variety of conditions, and to supply pure water under a wide variety of conditions with minimum fuel consumption and minimum evaporator capacity.

The following will serve as a practical illustration of how the apparatus may be run:

Boiler pressure _____ 100 lbs. per sq. in.
Heater pressure _____ 95 " " " "
Evaporator pressure _ 75 " " " "
Generator pressure ___ 20 " " " "

If the auxiliaries use very little steam, valves 39 and 41 will be closed, and the auxiliaries operated on steam from the evaporator, supplied through bypass 27. If, however, the auxiliaries take a great deal of steam, the bypass is opened wide and valve 41 is opened sufficiently to supply such steam as the evaporator cannot supply. Between these extremes, the apparatus may be operated by closing the valve in the bypass, operating the auxiliaries on live steam from pipe 26, and supplying the excess steam required by the generator 22 from the evaporating apparatus, through valve 39.

The evaporator will customarily be proportioned so as to supply about 30% of the water required, supplying it to the auxiliaries, or the generator, or both, in the form of steam. Condensation in chamber 7 of heater 2 will supply about 10% additional of the water required, and condensation in chamber 7 of evaporating section 3 will readily supply about 35% more water. The auxiliaries, when operated on steam from the boiler, will readily supply the additional water required, in the form of exhaust steam. The proportion of water supplied from these various parts of the apparatus will vary, however, according to the way the apparatus is operated, a wide variation being possible.

What I claim is:—

1. The method of evaporation and purification herein described, comprising spraying heated liquid to be evaporated into a heated chamber maintained under pressure, and thereby disengaging gaseous impurities, blowing off such impurities, conducting the liquid to a separate chamber and there evaporating it, and condensing the resulting vapor.

2. The method of evaporation and purification herein described, comprising spraying heated liquid to be evaporated into a heated chamber maintained under pressure, and thereby disengaging gaseous impurities, blowing off such impurities, conducting the liquid to a separate chamber and there evaporating it by exchange of heat with a condensing current of similar nature, condensing the vapor formed by such evaporation, mingling the two condensates and reboiling the same.

3. The herein described method of obtaining pure water which comprises evaporating water to steam by exchange of heat with heating steam of higher pressure derived from another source and in so doing condensing such heating steam and collecting the water of condensation so obtained, and supplying the steam so produced to heating means of a steam-heated apparatus and supplementing such steam by steam derived from another source and in such apparatus abstracting heat from the steam so supplied, and as a result of such abstraction of heat, condensing such steam, and collecting the water of condensation so obtained.

4. The herein described method of obtaining pure water which comprises evaporating water to steam by exchange of heat with heating steam of higher pressure derived from another source and in so doing condensing such heating steam and collecting the water of condensation so obtained, and supplying the steam so produced to heating means of a steam-heated apparatus and supplementing such steam by exhaust steam derived from another source and in such apparatus, abstracting heat from the steam so supplied, and as a result of such abstraction of heat condensing such steam, and reboiling the water of condensation so obtained.

5. The herein described process of obtaining pure water which comprises heating and evaporating water to steam by exchange of heat with heating steam derived from a primary steam generator operated under higher pressure and in so doing condensing such heating steam and collecting the water of condensation so obtained, feeding hot feed water into such generator from the water so heated, supplying the steam produced by such exchange to heating means of a steam-heated apparatus and supplementing such steam by steam derived from another source and in such apparatus abstracting heat from the steam so supplied, and as a result of such abstraction of heat condensing such steam.

6. The herein described process of obtaining pure water which comprises spraying hot water, obtained from an external source, into a heated chamber maintained under pressure, and thereby separating from such water gases carried by it, causing the gases so separated to escape, heating and evaporating such water by exchange of heat with heating steam derived from a primary steam generator operated under higher pressure and collecting the water of condensation so obtained, feeding hot gas-freed water from such chamber into said primary generator, supplying steam produced by such exchange to heating means of a steam-heated apparatus and supplementing such steam by steam derived from another source and in such apparatus abstracting heat from the steam so supplied, and as a result of such abstraction of heat condensing such steam, and collecting the water of condensation so obtained.

7. The herein described process of obtaining pure water which comprises evaporating water to steam by exchange of heat with heating steam of higher pressure derived from another source and in so doing condensing such heating steam and collecting the water of condensation so obtained, mingling with the steam produced by such exchange steam derived from another source, separating contained gases from such steam, and supplying such steam to heating means of a steam-heated apparatus and in such apparatus abstracting heat from the steam so supplied and as a result of such abstraction condensing such steam, and collecting the water of condensation so obtained.

8. The herein described process of obtaining pure water which comprises evaporating water to steam by exchange of heat with heating steam of higher pressure derived from another source and in so doing condensing such heating steam and collecting the water of condensation so obtained, mingling with the steam produced by such exchange steam derived from another source, separating contained gases from such steam, supplying such steam to heating means of a steam-heated apparatus and in such apparatus abstracting heat from the steam so supplied and as a result of such abstraction condensing such steam, and reboiling the water of condensation so obtained.

9. The herein described method of obtaining pure water and of utilizing the heat energy of steam under pressure, which comprises evaporating water under pressure and thereby producing primary high-pressure steam, evaporating another body of water under lower pressure by exchange of heat with and condensation of said primary steam, thereby producing secondary low-pressure steam, collecting the condensate from the high-pressure steam, doing work with the secondary steam and condensing it, and collecting the condensate of the secondary steam.

10. The herein described method of obtaining pure water and of utilizing the heat energy of the steam under pressure, which comprises evaporating water under pressure and thereby producing primary high-pressure steam, evaporating another body of water under lower pressure by exchange of heat with and condensation of said primary steam, thereby producing secondary low pressure steam, collecting the condensate from the high-pressure steam, doing work with the secondary steam and utilizing such work in the supply of further quantities of water for formation of secondary steam, condensing the secondary steam, and collecting the condensate of the secondary steam.

11. The herein described method of obtaining pure water for ice making, and of operating refrigerating apparatus, which comprises evaporating water under pressure and thereby producing primary high-pressure steam, evaporating another body of water under lower pressure by exchange of heat with and condensation of said primary steam, thereby producing secondary low-pressure steam, collecting the condensate from the high pressure steam, doing work with the secondary steam, and then passing such secondary steam through the heating conduit of the generator of an absorption refrigerating apparatus, and thereby condensing the secondary steam and operating the said generator, and collecting the condensate of the secondary steam.

12. The herein described method of obtaining pure water and of operating refrigerating apparatus, which comprises evaporating water under pressure and thereby producing primary high pressure steam, evaporating another body of water under lower pressure by exchange of heat with and condensation of said primary steam, thereby producing secondary low-pressure steam, collecting the condensate from the high-pressure steam, doing work with the secondary steam and utilizing such work in the supply of further quantity of water for formation of the secondary steam, and then passing such secondary steam through the heating conduit of the generator of an absorption refrigeration apparatus, and thereby condensing such secondary steam and operating said generator, and collecting the condensate of the secondary steam.

13. The herein described method of obtaining pure water for ice making, and of operating refrigerating apparatus, which comprises evaporating water under pressure and thereby producing primary high-pressure steam, evaporating another body of water under lower pressure by exchange of heat with and condensation of said primary steam, thereby producing secondary low-pressure steam, collecting the condensate from the high pressure steam, doing work with the secondary steam, and then passing such secondary steam through the heating conduit of the generator of an absorption refrigerating apparatus, and thereby condensing the secondary steam and operating the said generator, and supplying to said heating conduit of the generator, from the primary steam, such excess of steam over the available secondary steam, as may be required by said generator, and collecting the condensate from the secondary heating conduit of said generator.

14. Distillation apparatus comprising in combination a primary high-pressure steam generator, an evaporator constituting a secondary low-pressure steam generator and connections therefrom to said primary generator, whereby the evaporator is operated by steam from the primary generator, a steam engine operated by the secondary steam from said evaporator, means for condensing the secondary steam exhausted by said steam engine, and means for collecting the condensates of the primary and secondary steam.

15. Distillation apparatus comprising in combination a primary high-pressure steam generator, an evaporator constituting a secondary low-pressure generator and connections therefrom to said primary generator, whereby the evaporator is operated by steam from the primary generator, means operated by steam from the evaporator for supplying to said evaporator water for conversion into secondary steam, means for condensing the secondary steam, and means for collecting the condensates of the primary and secondary steam.

16. The combination with a generator of an absorption refrigerating apparatus, said generator comprising a heating conduit of a primary high pressure steam generator, an evaporator constituting a secondary low-pressure steam generator and connections therefrom to said primary generator, whereby said evaporator is operated by steam from the primary generator, a steam engine operated by secondary steam from said evaporator, means for conducting the exhaust of said engine to the heating conduit of said refrigerating apparatus generator, and means for collecting the condensates of the primary and secondary steam.

17. The combination with the generator and other steam using means, of an absorption refrigerating apparatus, of a source of steam supply, an evaporator and connections from said evaporator to said generator and said steam-using means, and from said source of steam supply to said steam-using means, whereby said steam-using means may be operated by steam derived either from the evaporator or from the source of steam supply, or both, said steam-using means having exhaust connections to the generator.

In testimony whereof I have signed this specification in the presence of two subscribing witnesses.

NICOLAI H. HILLER.

Witnesses:
    FRANK E. RAFFMAN,
    H. M. MARBLE.